US012712711B2

(12) United States Patent
Wu et al.

(10) Patent No.: US 12,712,711 B2
(45) Date of Patent: Aug. 18, 2026

(54) SECURITY GRAPH CONSTRUCTION ALGORITHM BASED ON PRIVATE SET INTERSECTION AND SECRET SHARING

(71) Applicant: Beijing Zitiao Network Technology Co., Ltd., Beijing (CN)

(72) Inventors: Xing Wu, Shanghai (CN); Chuyuan Chen, Shanghai (CN); Li Wang, Hangzhou (CN); Qiang Yan, Shanghai (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/766,149

(22) Filed: Jul. 8, 2024

(65) Prior Publication Data

US 2025/0385783 A1 Dec. 18, 2025

Related U.S. Application Data

(63) Continuation of application No. PCT/CN2024/099264, filed on Jun. 14, 2024.

(51) Int. Cl.
*H04L 29/06* (2006.01)
*G06F 21/00* (2013.01)
*H04L 9/08* (2006.01)

(52) U.S. Cl.
CPC ............ *H04L 9/0825* (2013.01); *H04L 9/085* (2013.01)

(58) Field of Classification Search
None
See application file for complete search history.

(56) References Cited

U.S. PATENT DOCUMENTS

2019/0132132 A1* 5/2019 Kersting ............... H04L 9/3242
2020/0389298 A1* 12/2020 Saxena ................... H04L 9/083
2023/0030624 A1* 2/2023 Zihayat Kermani .. G06N 5/041

FOREIGN PATENT DOCUMENTS

CN 101374155 * 10/2011
CN 106650487 A 5/2017
CN 118051751 A 5/2024
WO WO 2022251399 A1 12/2022

OTHER PUBLICATIONS

International Search Report in International Appln. No. PCT/CN2024/099264, mailed on Dec. 6, 2024, 12 pages.

* cited by examiner

*Primary Examiner* — Lisa C Lewis
(74) *Attorney, Agent, or Firm* — Fish & Richardson P.C.

(57) ABSTRACT

A computer-implemented method includes: mapping a first group of user identifiers that are active in a first region to generate a first group of anonymized user nodes of the first region; communicating with one or more second devices of a second region, using a privacy set intersection (PSI) protocol, to identify one or more intersecting signals accessed by the first group of anonymized user nodes of the first region and a second group of anonymized user nodes of the second region; constructing a user-signal-user graph based on the one or more intersecting signals and the first group of anonymized user nodes of the first region; communicating with the one or more second devices of the second region via secret sharing to calculate a weight of each intersecting signal; and constructing a use-user graph with at least one edge determined by the weight of each intersecting signal from the user-signal-user graph.

17 Claims, 8 Drawing Sheets

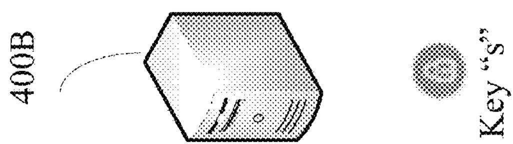
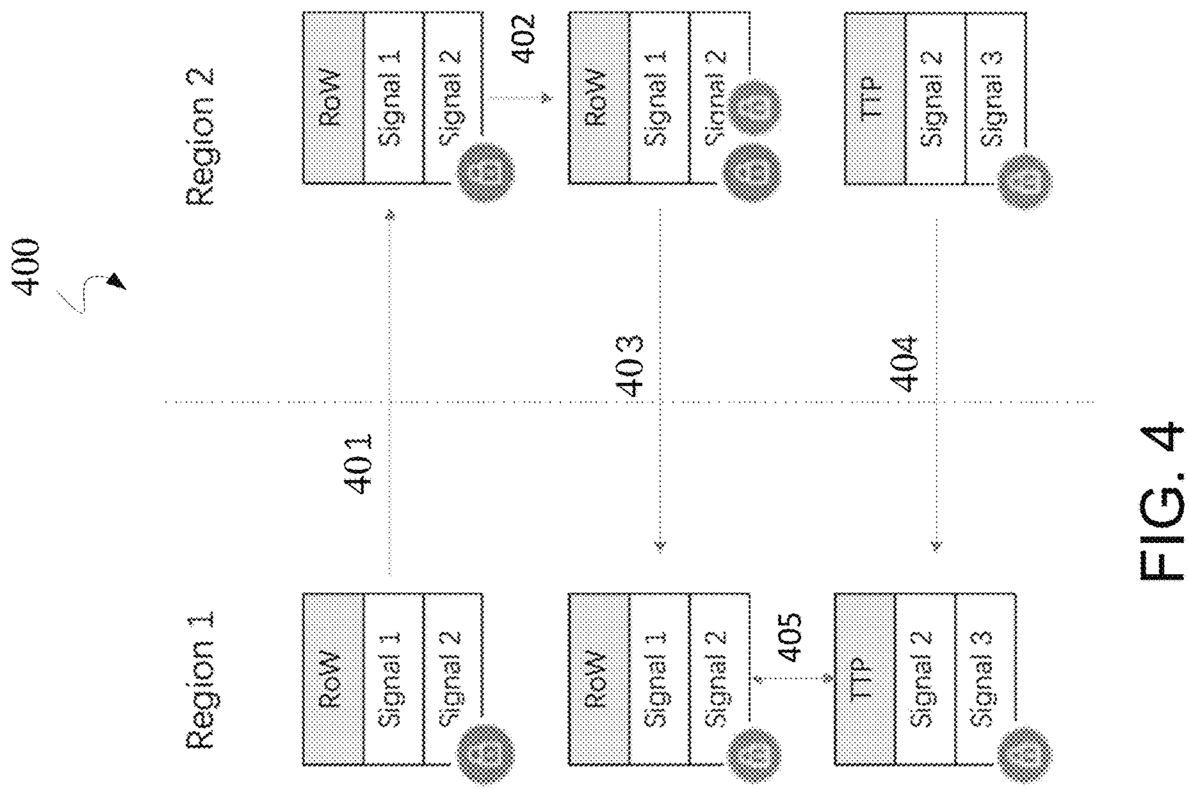
FIG. 4
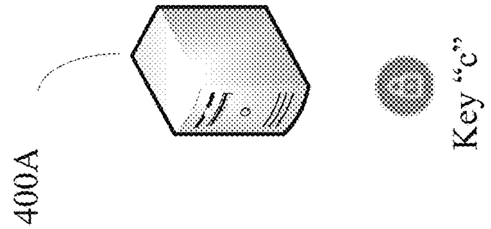

SECURITY GRAPH CONSTRUCTION ALGORITHM BASED ON PRIVATE SET INTERSECTION AND SECRET SHARING

CLAIM OF PRIORITY

This application claims priority under 35 USC § 120 to the Patent Cooperation Treaty PCT/CN2024/099264, filed on Jun. 14, 2024, the entire contents of which are hereby incorporated by reference.

TECHNICAL FIELD

This specification generally relates to graph construction for online platforms.

BACKGROUND

Online platforms such as a content sharing platform can connect its users from multiple regions, which may give rise to risk control scenarios where a user-user edge graph can be constructed for subsequent tasks related to risk control based on the user-user edge graph. Examples of risk control scenarios can include detecting specific online communities engaging in malicious activities. In this context, graph construction involves using signals, which can represent characteristics related to the scene of each participating user on the platform. For example, in a social networking software scene, signals may refer to features such as device name/identification, internet protocol (IP) address, and universal resource locator (URL) address as used by each participating user. Different users may have some of the same signals.

SUMMARY

In one aspect, some implementations provide a computer-implemented method that includes: mapping, by one or more first devices, a first plurality of user identifiers that are active in a first region to generate a first plurality of anonymized user nodes of the first region; communicating with one or more second devices of a second region, using a privacy set intersection (PSI) protocol, to identify one or more intersecting signals accessed by the first plurality of anonymized user nodes of the first region and a second plurality of anonymized user nodes of the second region; constructing, by the one or more first devices, a user-signal-user graph based on, at least in part, the one or more intersecting signals and the first plurality of anonymized user nodes of the first region; communicating with the one or more second devices of the second region, using a secret sharing protocol, to calculate a weight of each intersecting signal; and constructing, by the one or more first devices, a user-user graph with at least one edge determined by, at least in part, the weight of each intersecting signal from the user-signal-user graph.

The implementations may include one or more of the following features.

Communicating with one or more second devices of a second region using a PSI protocol includes: encrypting, using a first encryption key for the one or more first devices, a list of signals accessed by the anonymized user nodes of the first region to generate a first plurality of encrypted signals. The computer-implemented method may further include: receiving, from the one or more second devices of a second region, a second plurality of doubly encrypted signals accessed by the anonymized user nodes of the first region, wherein the second plurality of doubly encrypted signals are further encrypted based on a second encryption key for the one or more second devices of the second region; and decrypting, using the first encryption key for the one or more first devices, the second plurality of doubly encrypted signals accessed by the anonymized user nodes of the first region to generate a third plurality of encrypted signals encrypted based on the second encryption key for the one or more second devices of the second region. The computer-implemented method may further include: receiving, from the one or more second devices of a second region, a second plurality of encrypted signals accessed by the anonymized user nodes of the second region, wherein the second plurality of encrypted signals are encrypted based on the second encryption key for the one or more second devices of the second region; and comparing the second plurality of encrypted signals and the third plurality of encrypted signals to identify the one or more intersecting signals accessed by the first plurality of anonymized user nodes of the first region and a second plurality of anonymized user nodes of the second region. Communicating with the one or more second devices of the second region using a secret sharing protocol may include: using the secret sharing protocol to determine a count of anonymized user nodes connected to a particular intersecting signal from the first region and the second region; using the secret sharing protocol to determine a count of anonymized user nodes connected to each signal of a different type that neighbors the particular intersecting signal from the first region and the second region; and calculating the weight of the particular intersecting signal based on the count of anonymized user nodes connected to the particular intersecting signal and the count of anonymized user nodes connected to each signal of a different type that neighbors the particular intersecting signal. Calculating the weight of the particular intersecting signal may be performed without revealing information of the anonymized user nodes inside the second region to the one or more first devices of the first region. The at least one edge may be a cross-regional edge. The at least one anonymized user node of the first region may be connected to an anonymized user node of the second region via the cross-regional edge.

In another aspect, some implementations provide one or more computer-readable storage media encoded with instructions that, when executed by one or more computers, cause the one or more computers to perform operations including: mapping a first plurality of user identifiers that are active in a first region to generate a first plurality of anonymized user nodes of the first region; communicating with one or more devices of a second region, using a privacy set intersection (PSI) protocol, to identify one or more intersecting signals accessed by the first plurality of anonymized user nodes of the first region and a second plurality of anonymized user nodes of the second region; constructing a user-signal-user graph based on, at least in part, the one or more intersecting signals and the first plurality of anonymized user nodes of the first region; communicating with the one or more devices of the second region, using a secret sharing protocol, to calculate a weight of each intersecting signal; and constructing a use-user graph with at least one edge determined by, at least in part, the weight of each intersecting signal from the user-signal-user graph.

The implementations may include one or more of the following features.

Communicating with one or more devices of a second region using a PSI protocol may include: encrypting, using a first encryption key for the one or more computers, a list of signals accessed by the anonymized user nodes of the first region to generate a first plurality of encrypted signals. The operations may further include: receiving, from the one or more devices of a second region, a second plurality of doubly encrypted signals accessed by the anonymized user nodes of the first region, wherein the second plurality of doubly encrypted signals are further encrypted based on a second encryption key for the one or more devices of the second region; and decrypting, using the first encryption key for the one or more computers, the second plurality of doubly encrypted signals accessed by the anonymized user nodes of the first region to generate a third plurality of encrypted signals encrypted based on the second encryption key for the one or more devices of the second region. The operations may further include: receiving, from the one or more devices of a second region, a second plurality of encrypted signals accessed by the anonymized user nodes of the second region, wherein the second plurality of encrypted signals are encrypted based on the second encryption key for the one or more devices of the second region; and comparing the second plurality of encrypted signals and the third plurality of encrypted signals to identify the one or more intersecting signals accessed by the first plurality of anonymized user nodes of the first region and a second plurality of anonymized user nodes of the second region. Communicating with the one or more devices of the second region using a secret sharing protocol may include: using the secret sharing protocol to determine a count of anonymized user nodes connected to a particular intersecting signal from the first region and the second region; using the secret sharing protocol to determine a count of anonymized user nodes connected to each signal of a different type that neighbors the particular intersecting signal from the first region and the second region; and calculating the weight of the particular intersecting signal based on the count of anonymized user nodes connected to the particular intersecting signal and the count of anonymized user nodes connected to each signal of a different type that neighbors the particular intersecting signal. Calculating the weight of the particular intersecting signal may be performed without revealing information of the anonymized user nodes inside the second region to the one or more computers of the first region. The at least one edge may be a cross-regional edge. The at least one anonymized user node of the first region may be connected to an anonymized user node of the second region via the cross-regional edge.

In yet another aspect, some implementations provide a computer system comprising one or more computer processors configured to perform operations including: mapping a first plurality of user identifiers that are active in a first region to generate a first plurality of anonymized user nodes of the first region; communicating with one or more devices of a second region, using a privacy set intersection (PSI) protocol, to identify one or more intersecting signals accessed by the first plurality of anonymized user nodes of the first region and a second plurality of anonymized user nodes of the second region; constructing a user-signal-user graph based on, at least in part, the one or more intersecting signals and the first plurality of anonymized user nodes of the first region; communicating with the one or more devices of the second region, using a secret sharing protocol, to calculate a weight of each intersecting signal; and constructing a user-user graph with at least one edge determined by, at least in part, the weight of each intersecting signal from the user-signal-user graph.

The implementations may include one or more of the following features.

Communicating with one or more devices of a second region using a PSI protocol may include: encrypting, using a first encryption key for the one or more computers, a list of signals accessed by the anonymized user nodes of the first region to generate a first plurality of encrypted signals. The operations may further include: receiving, from the one or more devices of a second region, a second plurality of doubly encrypted signals accessed by the anonymized user nodes of the first region, wherein the second plurality of doubly encrypted signals are further encrypted based on a second encryption key for the one or more devices of the second region; and decrypting, using the first encryption key for the one or more computers, the second plurality of doubly encrypted signals accessed by the anonymized user nodes of the first region to generate a third plurality of encrypted signals encrypted based on the second encryption key for the one or more devices of the second region. The operations may further include: receiving, from the one or more devices of a second region, a second plurality of encrypted signals accessed by the anonymized user nodes of the second region, wherein the second plurality of encrypted signals are encrypted based on the second encryption key for the one or more devices of the second region; and comparing the second plurality of encrypted signals and the third plurality of encrypted signals to identify the one or more intersecting signals accessed by the first plurality of anonymized user nodes of the first region and a second plurality of anonymized user nodes of the second region. Communicating with the one or more devices of the second region using a secret sharing protocol may include: using the secret sharing protocol to determine a count of anonymized user nodes connected to a particular intersecting signal from the first region and the second region; using the secret sharing protocol to determine a count of anonymized user nodes connected to each signal of a different type that neighbors the particular intersecting signal from the first region and the second region; and calculating the weight of the particular intersecting signal based on the count of anonymized user nodes connected to the particular intersecting signal and the count of anonymized user nodes connected to each signal of a different type that neighbors the particular intersecting signal. Calculating the weight of the particular intersecting signal may be performed without revealing information of the anonymized user nodes inside the second region to the one or more computers of the first region. The at least one edge may be a cross-regional edge. The at least one anonymized user node of the first region may be connected to an anonymized user node of the second region via the cross-regional edge The subject matter described in this specification can be implemented in particular embodiments so as to realize one or more of the following advantages. First, some implementations employ technical solutions unique to computerized communication networks to securely obtain common signals shared by multiple regions for graph construction. In addition to de-identification that seals the true identity of participating users, the implementations incorporate a private set intersection (PSI) protocol to identify shared signals between two regions without revealing the private information of one region to the other. Further, the implementations incorporate secret sharing, as a computational cryptographic method, by splitting a secret, such as the weight of a connection, into multiple parts. Each part is then distributed to different participants, and the original secret can only be reconstructed when a sufficient number of these parts are combined. This technology is particularly useful in scenarios where sensitive information needs to be protected from unauthorized access, even if some of the participants or their shares are compromised.

Second, the implementations can enhance the security of online communications to solve the technical problem of cross-regional security graph construction when the private information (e.g., non-intersecting nodes) of each region is not leaked to the other region. Indeed, the implementations improve the operation of the underlying communication network. For example, some implementations maintain data integrity, accuracy, and security, thereby supporting a seamless and reliable operation for exchanging data. The exchange is conducted in real-time for regions with large numbers (e.g., hundreds of millions, billions, or more) of registered users. The sheer volume and speed render the computational tasks infeasible for the human mind. The details of one or more implementations of the subject matter of this specification are set forth in the description, the claims, and the accompanying drawings. Other features, aspects, and advantages of the subject matter will become apparent from the description, the claims, and the accompanying drawings.

BRIEF DESCRIPTION OF DRAWINGS

FIG. 4 illustrates an example of using a private set intersection (PSI) protocol to exchange shared signals between the two regions in the example of FIG. 3.

Like reference numbers and designations in the various drawings indicate like elements.

DETAILED DESCRIPTION

Figure 1:
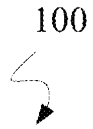
FIG. 1 illustrates an example of a workflow diagram for constructing a security graph.
Figure 1:
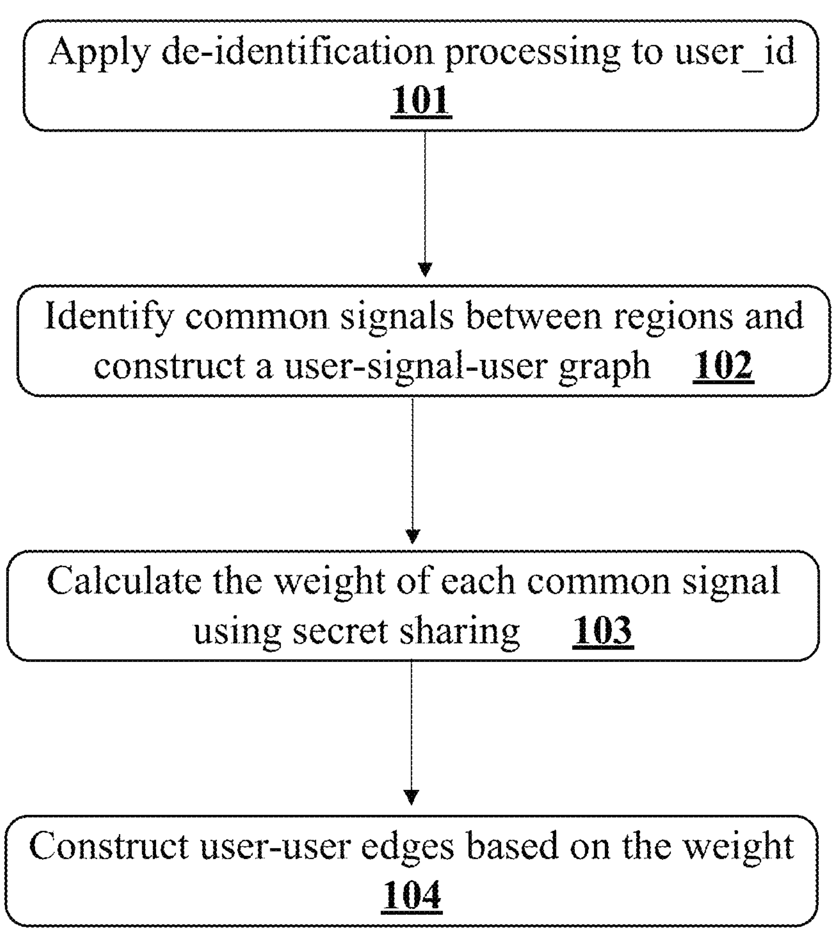

The disclosed technology addresses the technical challenge of constructing a user-user graph in a cross-regional environment where inter-regional data sharing is rather limited (e.g., constrained by the privacy requirements of each region). For example, privacy rules may prohibit entities in a region from revealing user-identifiable information of active users in the region to other regions. The region may refer to a geographic region, or virtual region defined by virtual private network (VPN) rules. Further, the computing server of the region may not reveal information specific to user activity to computing servers of other regions. Because computing servers of different regions may not exchange cross-regional data directly, constructing a user-user graph in the cross-regional environment can be challenging.

The disclosed technology includes the following salient features as part of a solution to the technical challenge. These salient features improve the operation of the underlying computing and communication infrastructure. First, many implementations incorporate a de-identification process to recast user identifiers into anonymized user nodes within each region. The mapping logic is specific to each region and reserved to each region. Because region 1 has no knowledge of region 2's map rule, when region 1 constructs a new edge to an anonymized user node in region 2, region 1 still would not know the actual user identifier that is connected to the new edge. De-identification may use a random map, e.g., where the computing server of a region controls the random number generator, or an encryption, e.g., where the computing server of the region possesses the encryption key.

Second, some implementations incorporate a privacy set intersection (PSI) protocol, which is a cryptographic technique that allows two interacting computing servers from respective neighboring regions to compare their private datasets and determine the common elements without revealing any other information about their respective datasets. PSI can be particularly useful in scenarios where two regions want to find intersections in their data without compromising the privacy of the data they hold. PSI may be applied in similar fashion to allow, for example, interacting computing servers from three neighboring regions to identify determine the common elements without revealing any other information about their respective datasets.

Third, some implementations incorporate a secret sharing technology as a cryptographic method to enhance the security of online communications by dividing a secret into multiple parts. Each part is then distributed to one of the regions involved, and the original secret can only be reconstructed when a sufficient number of these parts are combined. Secret sharing can be particularly useful in scenarios where sensitive information is split between multiple regions, and the reconstruction process does not reveal shares known by other regions.

The disclosed technology thus addresses the technical challenge of protecting data privacy that is unique to a modern platform digitally interconnecting a vast number of registered users. Examples can range from hundreds of thousands to billions of active users as recorded on modern online platforms including mobile network, content-sharing site, e-commerce site, or social network site. More details of these salient features are provided below with references to FIGS. 1 through 8.

FIG. 1 illustrates diagram 100 depicting an example of a workflow diagram for constructing a cross-regional security graph. For convenience, the process 100 will be described as being performed by a system of one or more computers, located in one or more locations, and programmed appropriately in accordance with this specification. For example, the system can include a server computer, e.g., the server computer FIG. 8, that when appropriately programmed, can perform the process 100. The system can incorporate a server computer for one of the multiple regions for which the cross-regional security graph is being constructed.

In step 101, the system applies de-identification processing to user identification information. To construct a cross-regional security graph, each user node on the platform has an identifier to distinguish from other user nodes. Each user node represents an operational node on the social networking platform where a user dwells for engaging with others on the social networking platform. An identifier is associated with each user node.

Figure 2:
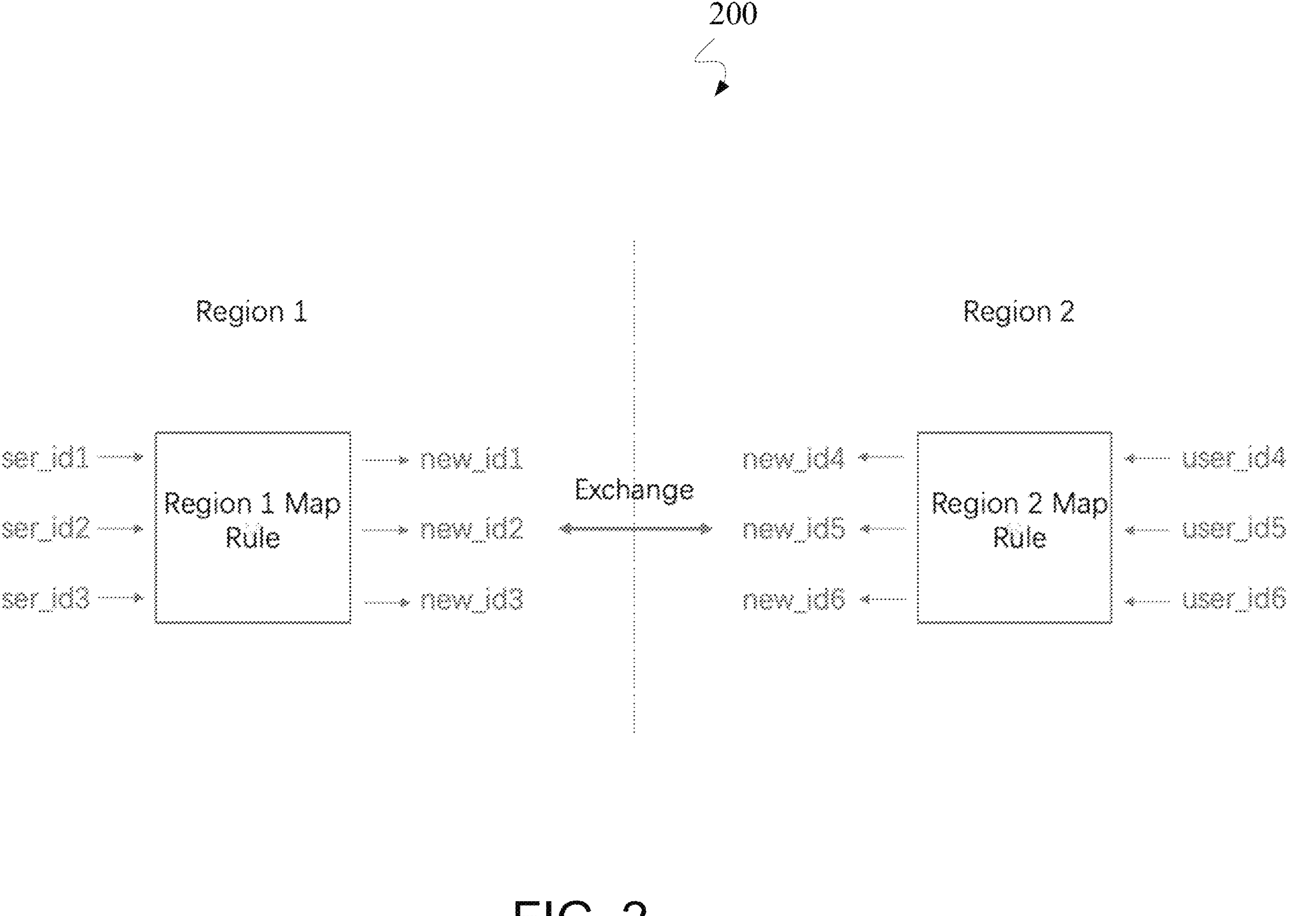
FIG. 2 illustrates an example of de-identification during the workflow diagram of FIG. 1.

Referring to FIG. 2, FIG. 2 illustrates an example process 200 of de-identification during step 101 of FIG. 1. As illustrated, two regions, namely, region 1 and region 2 both include a multitude of user IDs, which become de-identified. Region 1 may use a region 1 map rule to convert each user ID of region 1 (e.g., user_id1, user_id2, and user_id3) to a de-identified ID (e.g., new_id1, new_id2, and new_id3). The region 1 map rule is unique to region 1 and known only to a server operating at region 1. Region 2 may use region 2 map rule (unique to region 2 and known only to a server on region 2) so that each user ID of region 2 (e.g., user_id4, user_id5, and user_id6) to a de-identified ID (e.g., new_id4, new_id5, and new_id6).

In the cross-regional exchange, the de-identified IDs of one region are visible to the other region, and vice versa. In this manner, region 1 may not know the actual identity of any de-identified IDs from region 2 presented for cross-regional edge computation. Likewise, region 2 may not know the actual identity of de-identified IDs from region 1. As will be further explained with reference to FIG. 4, only the de-identified IDs of one region with a signal shared with IDs of the other region will be transported. In some implementations, each region incorporates a table (as the roadmap) in the map rule so that each identifier is assigned to a corresponding de-identified ID. The assignment can be pseudo-random, for example, determined by a random number generator on the server for the region. In these implementations, the table is maintained only at the server of the region. In some other implementations, each roadmap can encrypt the IDs using, for example, a cryptographic function to obtain the de-identified IDs in ciphertext. In these implementations, only the server of the region has the encryption key. Here, each ID can be a hash_id.

In step 102, the system identifies common signals for both regions using a private set intersection (PSI) protocol and then constructs a user-edge-user graph. The system may operate to use signals to find the pair-wise relationship between user nodes. Signals represent characteristics/features of a user, such as the login IP (internet protocol) address, account name, device ID etc. If two users have the same signals, then there may be an edge between the two users. For example, when user1 and user2 have the same login IP address, then these two users may be related, and hence have a common signal.

Figure 3:
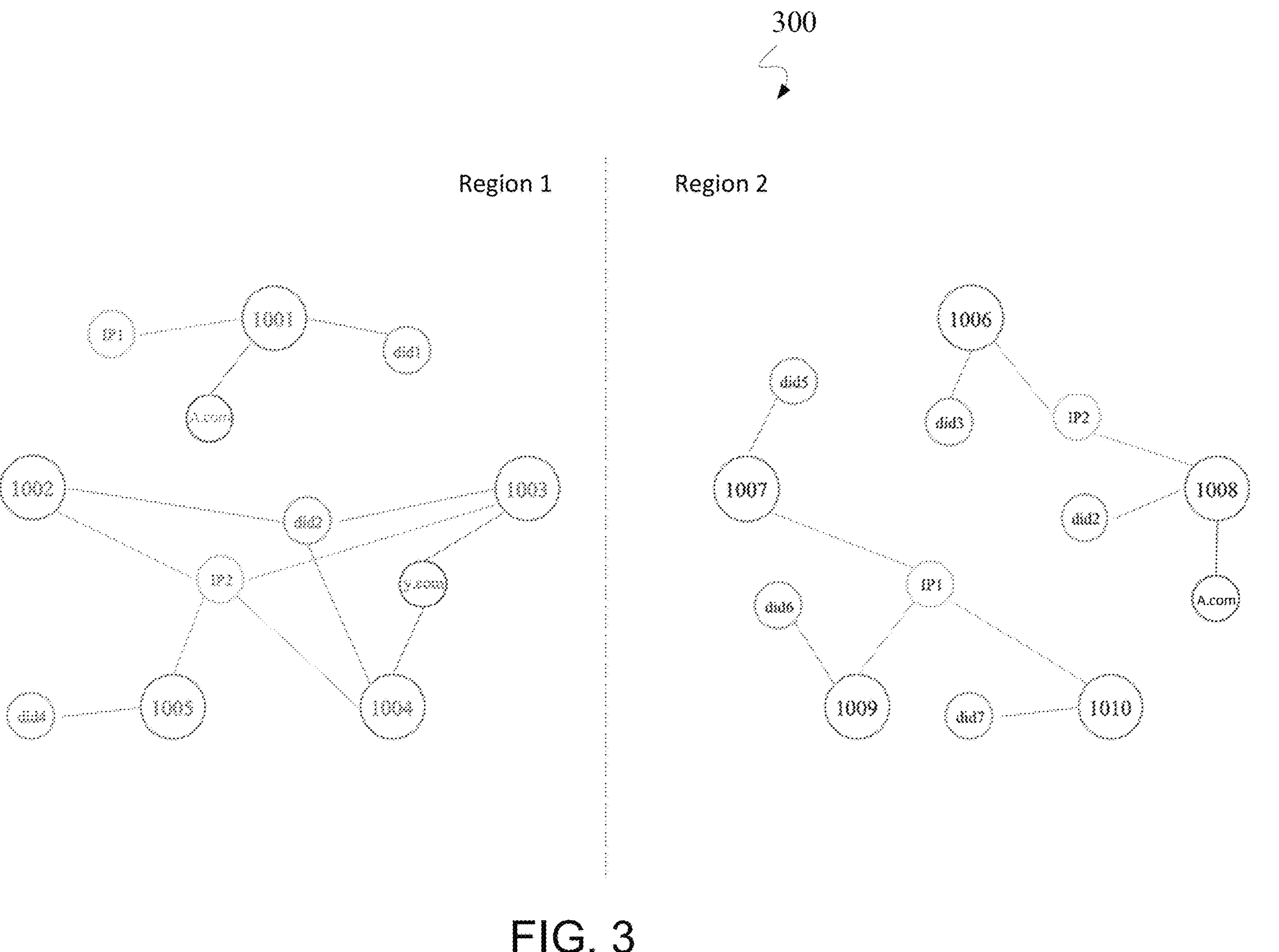
FIG. 3 illustrates an example of a user-signal-user graph between two regions.

Referring to FIG. 3, FIG. 3 provides an example 300 of a user-signal-user graph for further construction. The respective layout for each graph corresponding to region 1 and region 2 can be obtained within each region. In the example 300 of FIG. 3, region 1 has five users represented by nodes 1001, 1002, 1003, 1004, and 1005. User node 1001 is connected to signals IP1, did1 (device ID), and A.com. User node 1002 and user node 1003 share signal did2. User node 1003 and user node 1004 share signal Y.com. User nodes 1002, 1003, 1004 and 1005 share signal IP2. User node 1005 additionally has signal did4. Meanwhile, region 2 has user nodes 1006, 1007, 1008, 1009, and 1010. User node 1006 has signal did3. Use node 1006 and user node 1008 share signal IP2. User node 1008 additionally has signals did2 and z.com. User node 1007 has signal did5. User node 1007, user node 1009, and user node 1010 share signal IP1. User node 1010 additionally has signal did7. User node 1009 additionally has node did6. As can be seen, there are intersecting signals for both region 1 and region 2, such as IP1, IP2, and did2. These intersecting signals are also known as common signals, which can bridge a cross-regional graph. The technical challenge, however, is how to find these intersecting signals without revealing additional information of the other region.

Referring to FIG. 4, the system can identify common signals for both regions using a private set intersection (PSI) protocol. As illustrated in diagram 400 of FIG. 4, the system is configured as a computer server 400A for region 1 and equipped with a first key, e.g., key c. The first key can be generated by the computer server 400A for region 1 or obtained from another source, such as an encryption library, which generates a one-time private key for the computer server. In some implementations, key a can be an elliptic curve key. Other forms of encryption can also be used, such as, for example, RSA (Rivest—Shamir—Adleman) keys. The computer server for region 1 also holds a list of signals $\{Signal_j\}$, j=1, . . . m. The signals can be, for example, IP address, device ID, a website. The list of signals are private information for region 1 and may not be shared with other regions. In some cases, the signals can be hashed to a uniform bit length (e.g., 256-bit length) using a hash function (e.g., Secure Hash Algorithm 256-bit, also known as SHA-256). The list of signals are encrypted using the private key of the computer server for region 1 to generate $\{(Signalj)^c\}$, j=1, . . . , m. The encrypted signal list is then transmitted to a computer server for region 2 (401).

The computer server 400B for region 2 performs a blind operation on a received list of signals encrypted using the private key "s" of the computer server 400B for region 2 (402). In some implementations, key a can be an elliptic curve key, or an RSA (Rivest—Shamir—Adleman) key. As illustrated, the bind operation encrypts the received list of encrypted signals using the private key s of the computer server for region 2 to generate $\{((Signal_j)^c)^s\}$, j=1, . . . , m. The doubly encrypted signal list is then transmitted back to the computer server 400A for region 1 (403). This operation may also be known as the "double blind" operation.

The computer server for region 2 also encrypts a separate list of signals that are present between active users in region 2 using the private key s to generate encrypted records $\{Signal_i)^s\}$, i=1, . . . , n. In some cases, a cryptographic hash function first hashes the separate list of signals to a hashed result in cipher text format of a uniform bit length (e.g., 256-bit length). The computer server 400B for region 2 may then encrypt each hashed signal using key s, which generates a ciphertext, i.e., a bit string of what appears to be a random and indecipherable string of bit values. The computer server 400B for region 2 may then transmit the encrypted separate list of signals to the server computer for region 1 (404).

In the illustrated example of FIG. 4, when the server computer for one region communicates with the server computer for the other region, the server computer for the other region may distribute tasks or computations among the available computational resources based on factors like resource availability, workload balancing, and optimization objectives. Examples of distributed computing scenarios can include distributed data processing, distributed storage systems, and distributed computing clusters. In an example of distributed processing, large volumes of data are processed across multiple computing nodes or servers simultaneously, which generally involves parallelization of data processing tasks to allow for faster data analysis, querying, and computation. In another example of distributed storage systems, the server computer of the other region may replicate and distribute data across multiple storage nodes to allow for fault tolerance, scalability, and high availability. Here, data is typically partitioned and distributed across the storage nodes, and redundancy mechanisms such as replication or erasure coding are employed to protect against data loss. Examples of distributed computing clusters may include interconnected computing nodes on an inter-node high-speed network to execute computational tasks in parallel.

As illustrated, the server computer 400A for region 1 performs an unblind operation on the received doubly encrypted signal list by decrypting the doubly encrypted $\{((\text{Signalj})^c)^s\}$, j=1, . . . , m to obtain $\{(\text{Signalj})^s\}$, j=1 . . . , m. At this point, the signal listing from region 1 and the signal listing from region 2 are both only encrypted with the key for region 2 (e.g., the key dedicated for the computer server of region 2). The server computer 400A of region 1 can directly compare the two signal listings to find intersecting nodes and doesn't leak any additional information. As illustrated, the server computer for region 1 may compare (405) the signal listing of $\{(\text{Signal}_j)^s\}$, j=1, . . . , m with the signal listing $\{\text{Signal}_i)^s\}$, i=1 . . . , n received from the computer server for region 2. This comparison reveals signal 2 as shared by both regions. Because the server computer for region 1 has knowledge of the user nodes connected to signal 2, the intersecting user nodes can thus be determined.

Figure 5:
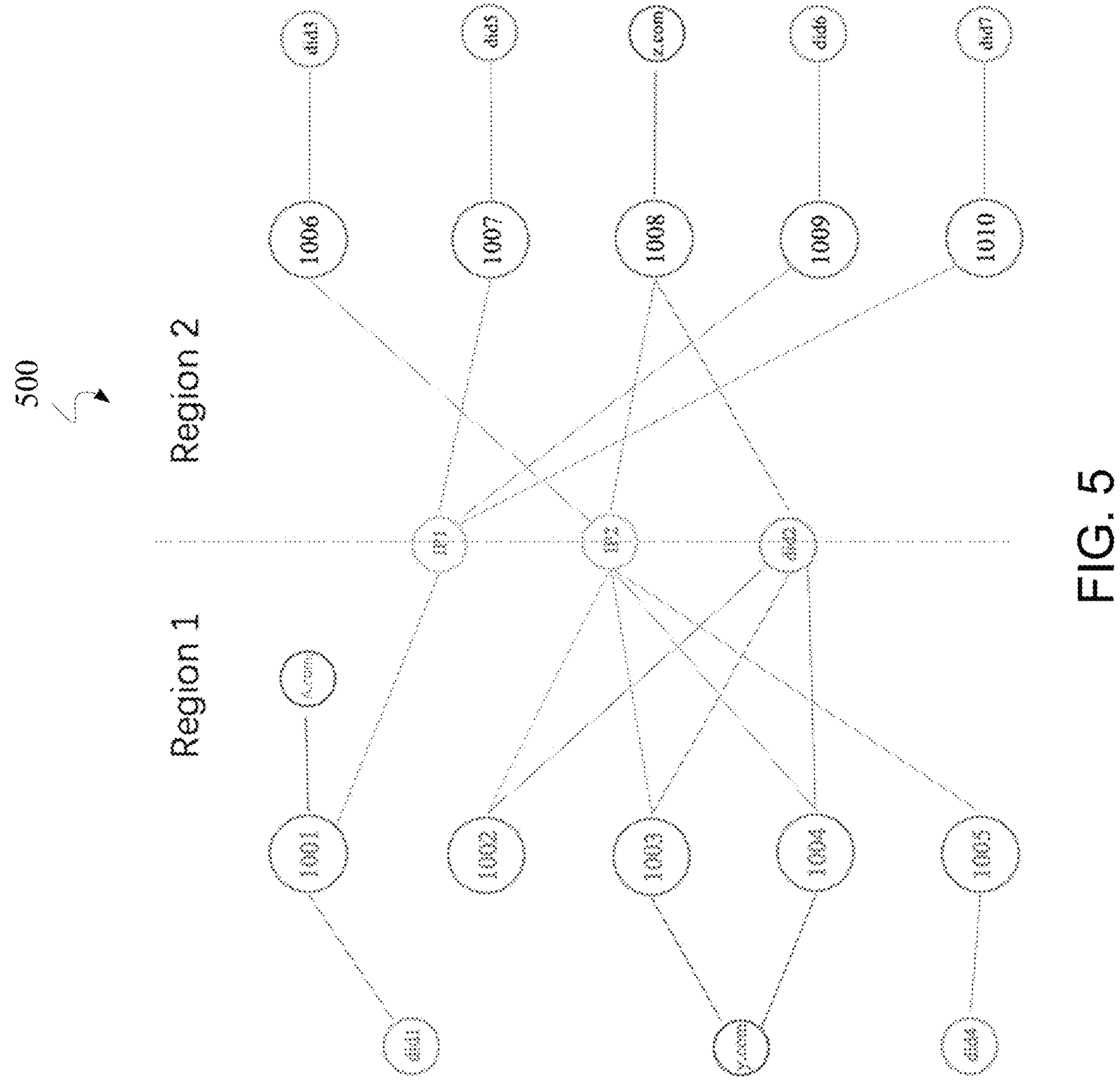
FIG. 5 illustrates an example of a cross-regional user-signal-user connection graph showing the shared signals obtained using the example of FIG. 4.

Based on results from the PSI processing, as illustrated above in diagram 400 of FIG. 4, a cross-regional user-signal-user connection graph can be obtained. As illustrated in FIG. 5, the cross-regional user-signal-user connection graph can include region 1 and region 2 bordering on each other and sharing three signals, namely, IP1, IP2, and did2. Taking signal IP1 as an example, IP1 is an intersecting signal found through the exchange process using PSI technology, as illustrated in FIG. 4. However, the connection information of IP1 in region 1 and the connection information of IP1 in Region 2 remain invisible to the other region because such information is not leaked. Here, region 1 includes user nodes 1001, 1002, 1003, 1004, 1005 in further connection to signals did1. A.com, y.com, and did4 while region 2 includes user nodes 1006, 1007, 1008, 1009, and 1010 in further connection to did3, did5, z.com, did6, and did7, consistent with the user-signal-user graph as originally shown in FIG. 3.

Returning to FIG. 1, in step 103, the system calculates the weight of signals using secret sharing method. As shown in diagram 500 of FIG. 5, there are three types of signals in this graph: IP address (e.g., IP1 and IP2), URL address (A.com, y.com, and z.com), and device_id (did1, did2, did3, did4, did5, did6, did7). The system can calculate weight for each signal. Taking IP1 as an example, the calculation process may initially calculate basecnt, which refers to the count of users connected to IP1. The calculation process may then calculate $\text{targetent}_k$, which refers to a target count for each neighboring $\text{Signal}_k$ that is not the same type as IP1. The count can be the count of users connected to $\text{Signal}_k$. In this case, $\text{Signal}_k$ includes {did1, A.com, did5, did6, did7}. The calculation process may then calculate the weight for IP1 as:

$$\text{weight}_{IP1} = \frac{\max(targetcnt_k) - 1}{basecnt} \tag{1}$$

The calculation of basecnt in equation (1) may require knowledge of the number of users from both regions connected to IP1. However, from the perspective of each one of the two regions, it is not known how many users of the other region are connected to the IP signal. Therefore, this value exists in a state of secret sharing. Similarly, the value of $\text{targetcnt}_k$ also exists in a state of secret sharing.

By way of context, secret sharing can refer to the state of the existence of a value. For example, for a value of 8, region 1 records a portion of 3 and region 2 records a portion of 5. The fact is that the value is 8, but region 1 and region 2, due to the lack of information about the other side, do not know the exact result. In this example, the secret (an actual value) is split into several pieces, known as shares, using a mathematical algorithm. One of the most common algorithms for this purpose is Shamir's secret sharing scheme based on polynomial interpolation. When the shares are distributed to different parties, each party holds only a portion of the secret, and no individual share reveals any information about the original secret. During reconstruction, using these shares, the polynomial can be reconstructed through interpolation, and the secret (the constant term) can be recovered.

Secret sharing can also refer to a calculation method, which can generate an output based on the inputs that are secretly shared. In view of the above, equation (1) may be adapted to calculate $\text{weight}_{IP1}$ as:

$$[\text{weight}_{IP1}]_{r1}, [\text{weight}_{IP1}]_{r2} = \frac{\max([\text{target}_k]_{r1} + [\text{target}_k]_{r2}) - 1}{[basecnt_{r1}] + [basecnt_{r2}]} \tag{2}$$

Here, $[*]_{r1}$, $[*]_{r2}$ represent any variable exists in a state of secret sharing.

For the calculated $$[\text{weight}_{IP1}]_{r1}, [\text{weight}_{IP1}]_{r2},$$

secret sharing can be used to determine whether weightIP1 is greater than or equal to 0.5. If $$\text{weight}_{IP1} >= 0.5,$$

then the true value may be revealed.

Figure 6:
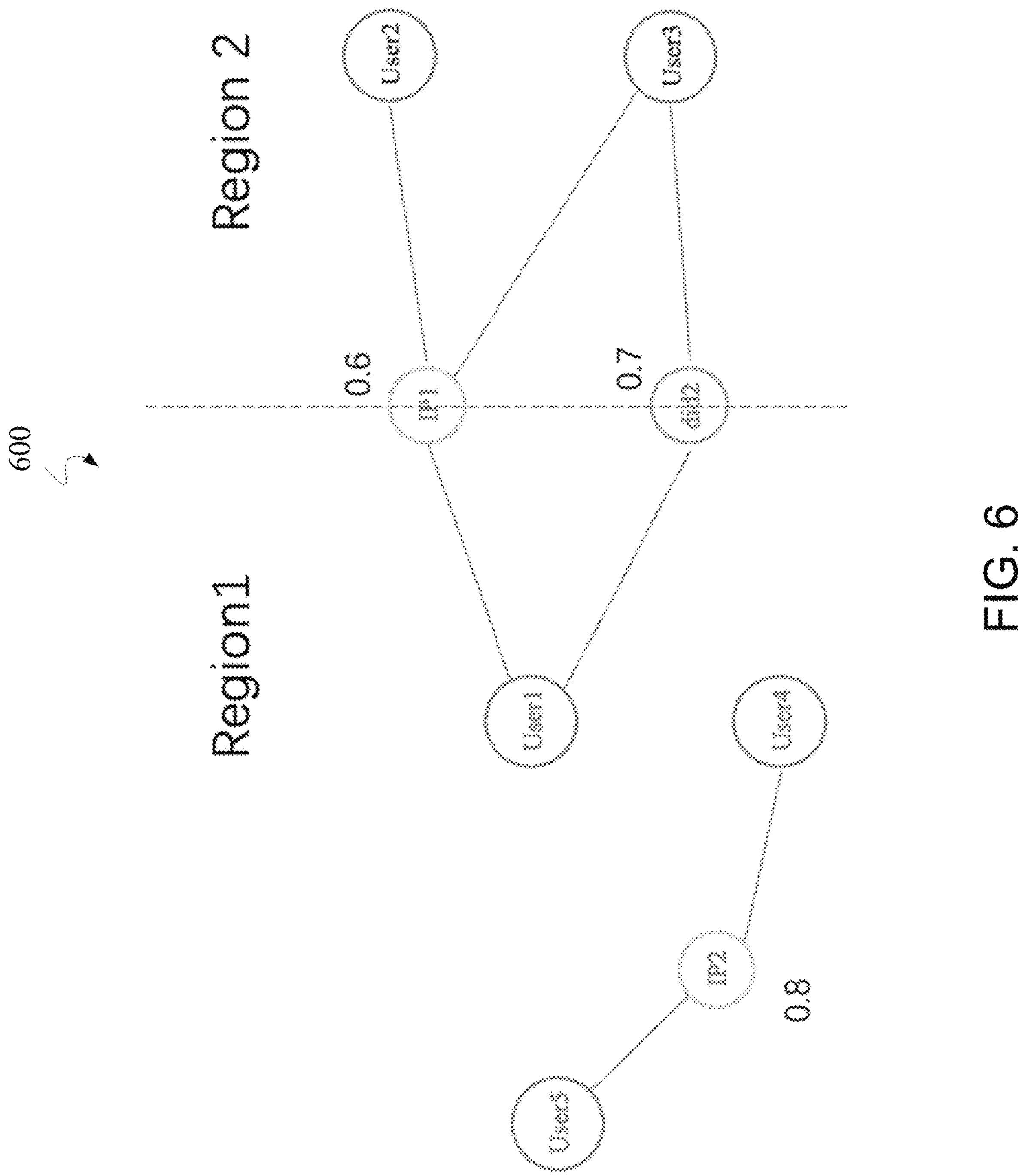
FIG. 6 illustrates an example of a user-user connection graph with weights calculated for each signal.
Figure 7:
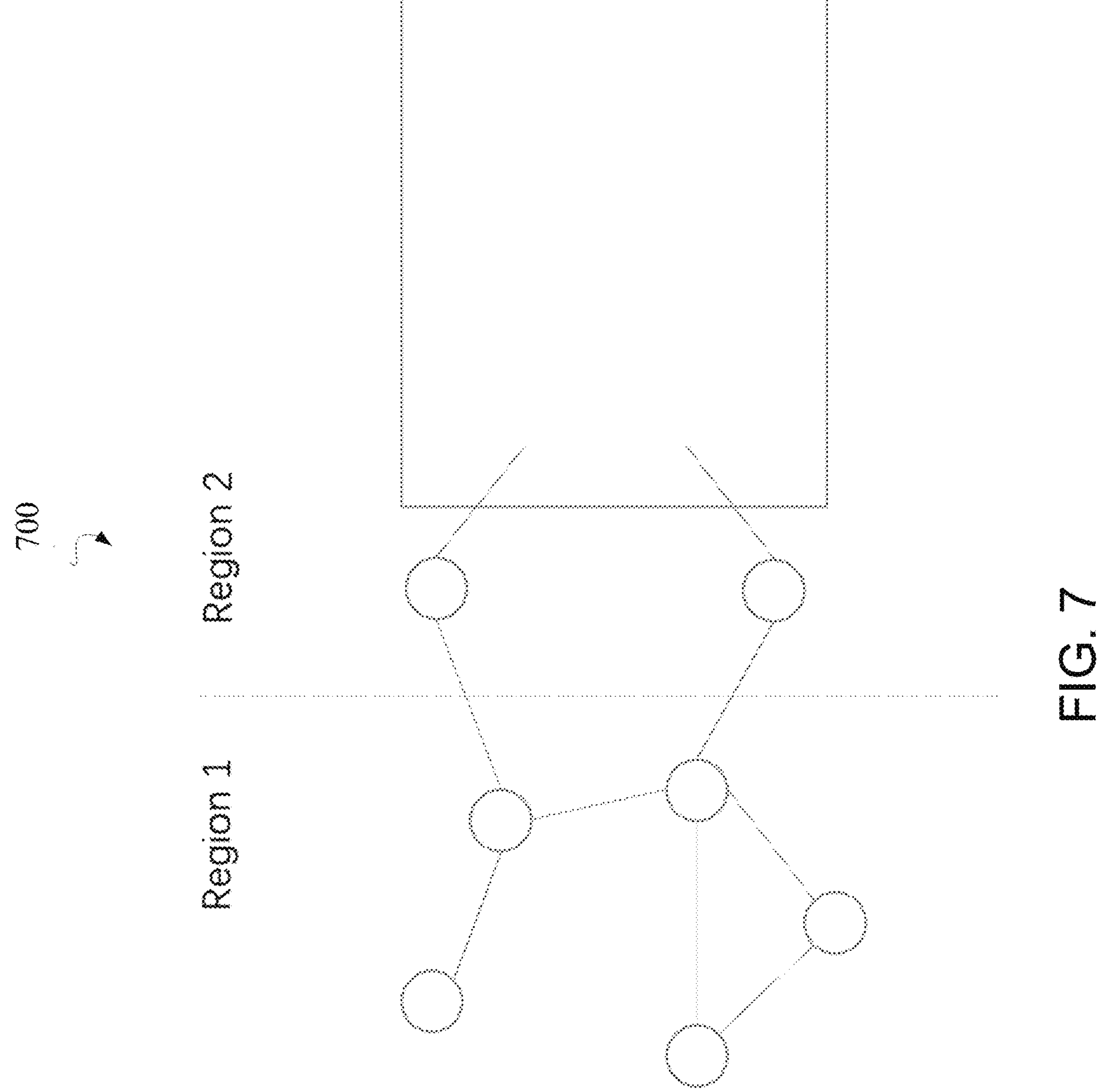
FIG. 7 illustrates an example of edges visible to one of the two interacting regions in the example of FIG. 6.

Returning to FIG. 1, in step 104, the system constructs the user-user edges by calculating the weight of user-user edges based on the signal weight from step 103. The system may only consider the signal whose weight is greater than or equal to 0.5 in step 103. Using these signals, the user-user edges can be constructed, as shown in the example of FIG. 6. The construction may entail two situations. In the first situation, for internal signals, edges can be directly constructed within the region. For example, using IP2, a connection can be directly constructed between user 4 and user 5. In the second situation, for cross-regional signals, cross-regional edges can be constructed. Here, both region 1 and region 2 need to be aware of which user nodes are connected to the cross-regional signal. Taking signal IP1 as an example, region 2 needs to send information about user 2 and user 3 connected to IP1 to region 1, while region 1 needs to send information about user 1 connected to IP1 to region 2. As described in step 101, these user_ids are de-identified and no longer reflect the originally provided user_id. In other words, the de-identified user_ids only serve as a graph identifier.

Based on the information provided, the system can construct the edges as shown in diagram 600 of FIG. 6. Diagram 600 shows that user1 and user3 are connected to each other by more than one signal, and the values of different signals need to be added together. Indeed, the edges and corresponding weights constructed based on the above example graph can be summarized as follows:

$$\text{User4}-\text{User5}=\text{weight}(IP2)=0.8.$$

$$\text{User1}-\text{User2}=\text{weight}(IP1)=0.6.$$

$$\text{User1}-\text{User3}=\text{weight}(IP1)+\text{weight}(\text{did2})=0.6+0.7=1.3.$$

Through steps 101 to 104 of FIG. 1, a cross-regional user-user graph can be constructed without direct exchange of data between the two regions. From the perspective of the server computer of region 1, it can only see the internal edges of region 1 and the (intersecting) edges directly connected to region 1, but not the internal edges of region 2, as illustrated in diagram 700 of FIG. 7.

Moreover, by virtue of de-identification of user_id, the real user information of each node is hidden. Therefore, for cross-regional edges, the server computer of region 1 does not know the original user_id connected to the intersecting edge from region 2. From the perspective of region 2, similar information is likewise hidden. In this regard, the implementations of the present disclosure can construct the cross-regional user-user graph while protecting internal information of each region.

Figure 8:
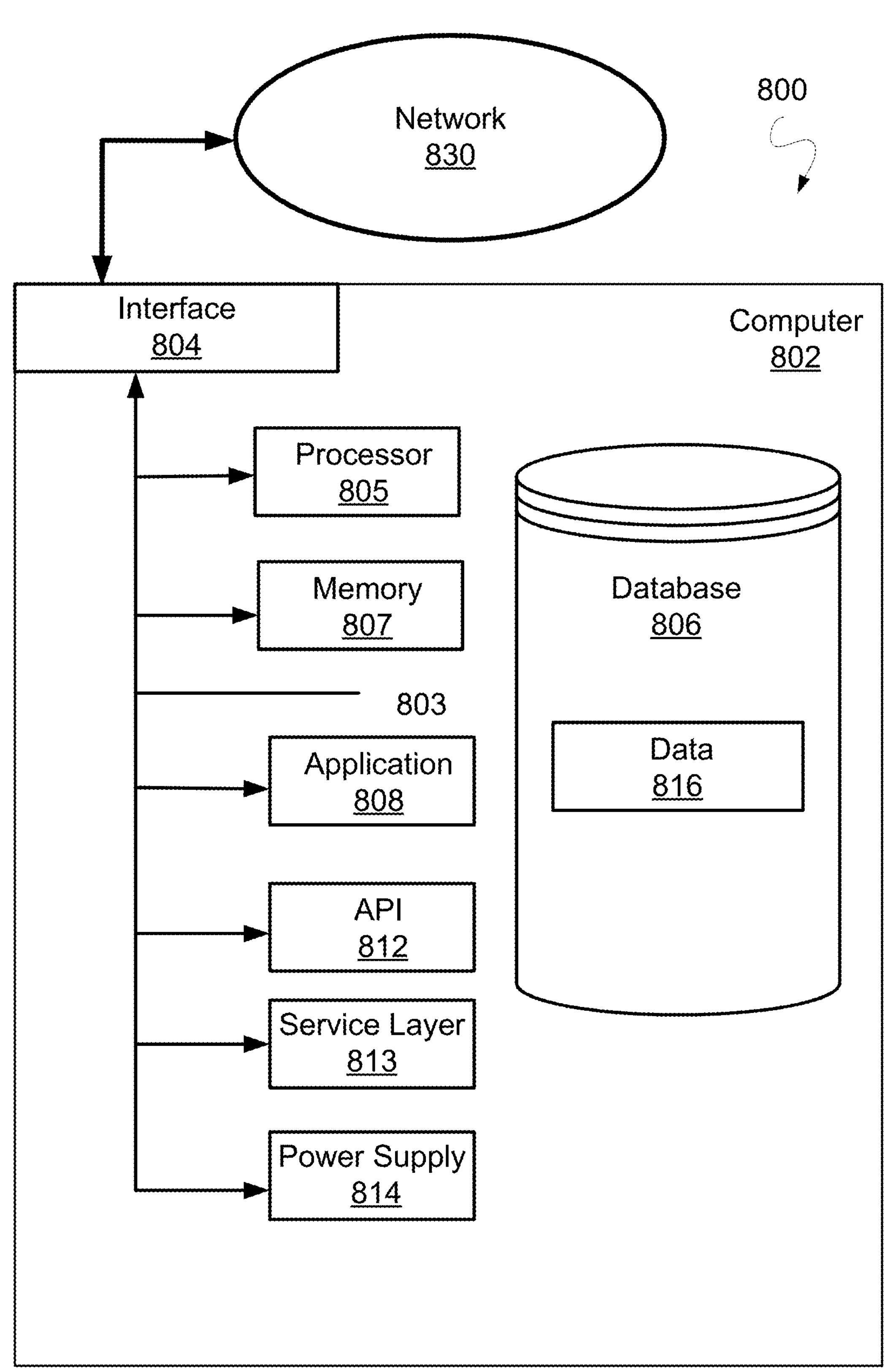
FIG. 8 is a block diagram illustrating an example of a computer system used to provide computational functionalities associated with described algorithms, methods, functions, processes, flows, and procedures, according to an implementation of the present disclosure.

FIG. 8 is a block diagram illustrating an example of a computer system 800 used to provide computational functionalities associated with described algorithms, methods, functions, processes, flows, and procedures, according to an implementation of the present disclosure. The illustrated computer 802 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 802 can comprise a computer that includes an input device, such as a keypad, keyboard, touch screen, another input device, or a combination of input devices that can accept user information, and an output device that conveys information associated with the operation of the computer 802, including digital data, visual, audio, another type of information, or a combination of types of information, on a graphical-type user interface (UI) (or GUI) or other UI.

The computer 802 can serve in a role in a computer system as a client, network component, a server, a database or another persistency, another role, or a combination of roles for performing the subject matter described in the present disclosure. The illustrated computer 802 is communicably coupled with a network 830. In some implementations, one or more components of the computer 802 can be configured to operate within an environment, including cloud-computing-based, local, global, another environment, or a combination of environments.

The computer 802 is an electronic computing device operable to receive, transmit, process, store, or manage data and information associated with the described subject matter. According to some implementations, the computer 802 can also include or be communicably coupled with a server, including an application server, e-mail server, web server, caching server, streaming data server, another server, or a combination of servers.

The computer 802 can receive requests over network 830 (for example, from a client software application executing on another computer 802) and respond to the received requests by processing the received requests using a software application or a combination of software applications. In addition, requests can also be sent to the computer 802 from internal users, external or third-parties, or other entities, individuals, systems, or computers.

Each of the components of the computer 802 can communicate using a system bus 803. In some implementations, any or all of the components of the computer 802, including hardware, software, or a combination of hardware and software, can interface over the system bus 803 using an application programming interface (API) 812, a service layer 813, or a combination of the API 812 and service layer 813. The API 812 can include specifications for routines, data structures, and object classes. The API 812 can be either computer-language independent or dependent and refer to a complete interface, a single function, or even a set of APIs. The service layer 813 provides software services to the computer 802 or other components (whether illustrated or not) that are communicably coupled to the computer 802. The functionality of the computer 802 can be accessible for all service consumers using this service layer. Software services, such as those provided by the service layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 802, alternative implementations can illustrate the API 812 or the service layer 813 as stand-alone components in relation to other components of the computer 802 or other components (whether illustrated or not) that are communicably coupled to the computer 802. Moreover, any or all parts of the API 812 or the service layer 813 can be implemented as a child or a sub-module of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802. The interface 804 is used by the computer 802 for communicating with another computing system (whether illustrated or not) that is communicatively linked to the network 830 in a distributed environment. Generally, the interface 804 is operable to communicate with the network 830 and comprises logic encoded in software, hardware, or a combination of software and hardware. More specifically, the interface 804 can comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors can be used according to particular needs, desires, or particular implementations of the computer 802. Generally, the processor 805 executes instructions and manipulates data to perform the operations of the computer 802 and any algorithms, methods, functions, processes, flows, and procedures as described in the present disclosure.

The computer 802 also includes a database 806 that can hold data 816 for the computer 802, another component communicatively linked to the network 830 (whether illustrated or not), or a combination of the computer 802 and another component. For example, database 806 can be an in-memory, conventional, or another type of database storing data consistent with the present disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases of similar or differing types can be used according to particular needs, desires, or particular implementations of the computer 802 and the described functionality. While database 806 is illustrated as an integral component of the computer 802, in alternative implementations, database 806 can be external to the computer 802. As illustrated, the database 806 holds the previously described data 816 including, for example, data being encrypted and data received from computer servers of other regions.

The computer 802 also includes a memory 807 that can hold data for the computer 802, another component or components communicatively linked to the network 830 (whether illustrated or not), or a combination of the computer 802 and another component. Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 or similar or differing types can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in the present disclosure. For example, application 808 can serve as one or more components, modules, or applications. Further, although illustrated as a single application 808, the application 808 can be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or another power management functionality). In some implementations, the power-supply 814 can include a power plug to allow the computer 802 to be plugged into a wall socket or another power source to, for example, power the computer 802 or recharge a rechargeable battery.

There can be any number of computers 802 associated with, or external to, a computer system containing computer 802, each computer 802 communicating over network 830. Further, the term "client," "user," or other appropriate terminology can be used interchangeably, as appropriate, without departing from the scope of the present disclosure. Moreover, the present disclosure contemplates that many users can use one computer 802, or that one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory devices. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:

mapping, by one or more first devices, a first plurality of user identifiers that are active in a first region to generate a first plurality of anonymized user nodes of the first region;

communicating with one or more second devices of a second region, using a privacy set intersection (PSI) protocol, to identify one or more intersecting signals accessed by the first plurality of anonymized user nodes of the first region and a second plurality of anonymized user nodes of the second region;

constructing, by the one or more first devices, a user-signal-user graph based on, at least in part, the one or more intersecting signals and the first plurality of anonymized user nodes of the first region;

communicating with the one or more second devices of the second region, using a secret sharing protocol, to calculate a weight of each intersecting signal, wherein said communicating comprises:

using the secret sharing protocol to determine a count of anonymized user nodes connected to a particular intersecting signal from the first region and the second region;

using the secret sharing protocol to determine a count of anonymized user nodes connected to each signal of a different type that neighbors the particular intersecting signal from the first region and the second region; and calculating the weight of the particular intersecting signal based on the count of anonymized user nodes connected to the particular intersecting signal and the count of anonymized user nodes connected to each signal of a different type that neighbors the particular intersecting signal; and constructing, by the one or more first devices, a user-user graph with at least one edge determined by, at least in part, the weight of each intersecting signal from the user-signal-user graph.

2. The computer-implemented method of claim 1, wherein communicating with one or more second devices of a second region using a PSI protocol comprises:

encrypting, using a first encryption key for the one or more first devices, a list of signals accessed by the anonymized user nodes of the first region to generate a first plurality of encrypted signals.

3. The computer-implemented method of claim 2, further comprising:

receiving, from the one or more second devices of a second region, a first plurality of doubly encrypted signals accessed by the anonymized user nodes of the first region, wherein the first plurality of doubly encrypted signals are further encrypted based on a second encryption key for the one or more second devices of the second region; and decrypting, using the first encryption key for the one or more first devices, the first plurality of doubly encrypted signals accessed by the anonymized user nodes of the first region to generate a third plurality of encrypted signals encrypted based on the second encryption key for the one or more second devices of the second region.

4. The computer-implemented method of claim 3, further comprising:

receiving, from the one or more second devices of a second region, a second plurality of encrypted signals accessed by the anonymized user nodes of the second region, wherein the second plurality of encrypted signals are encrypted based on the second encryption key for the one or more second devices of the second region; and comparing the second plurality of encrypted signals and the third plurality of encrypted signals to identify the one or more intersecting signals accessed by the first plurality of anonymized user nodes of the first region and a second plurality of anonymized user nodes of the second region.

5. The computer-implemented method of claim 1, wherein said calculating the weight of the particular intersecting signal is performed without revealing information of the anonymized user nodes inside the second region to the one or more first devices of the first region.

6. The computer-implemented method of claim 1, wherein the at least one edge is a cross-regional edge, and at least one anonymized user node of the first region is connected to an anonymized user node of the second region via the cross-regional edge.

7. One or more non-transitory computer-readable storage media encoded with instructions that, when executed by one or more computers, cause the one or more computers to perform operations comprising:

mapping a first plurality of user identifiers that are active in a first region to generate a first plurality of anonymized user nodes of the first region;

communicating with one or more devices of a second region, using a privacy set intersection (PSI) protocol, to identify one or more intersecting signals accessed by the first plurality of anonymized user nodes of the first region and a second plurality of anonymized user nodes of the second region;

constructing a user-signal-user graph based on, at least in part, the one or more intersecting signals and the first plurality of anonymized user nodes of the first region;

communicating with the one or more devices of the second region, using a secret sharing protocol, to calculate a weight of each intersecting signal, wherein said communicating comprises:

using the secret sharing protocol to determine a count of anonymized user nodes connected to a particular intersecting signal from the first region and the second region;

using the secret sharing protocol to determine a count of anonymized user nodes connected to each signal of a different type that neighbors the particular intersecting signal from the first region and the second region; and calculating the weight of the particular intersecting signal based on the count of anonymized user nodes connected to the particular intersecting signal and the count of anonymized user nodes connected to each signal of a different type that neighbors the particular intersecting signal; and constructing a use-user graph with at least one edge determined by, at least in part, the weight of each intersecting signal from the user-signal-user graph.

8. The one or more non-transitory computer-readable storage media of claim 7, wherein communicating with one or more devices of a second region using a PSI protocol comprises:

encrypting, using a first encryption key for the one or more computers, a list of signals accessed by the anonymized user nodes of the first region to generate a first plurality of encrypted signals.

9. The one or more non-transitory computer-readable storage media of claim 8, wherein the operations further comprise:

receiving, from the one or more devices of a second region, a first plurality of doubly encrypted signals accessed by the anonymized user nodes of the first region, wherein the first plurality of doubly encrypted signals are further encrypted based on a second encryption key for the one or more devices of the second region; and decrypting, using the first encryption key for the one or more computers, the first plurality of doubly encrypted signals accessed by the anonymized user nodes of the first region to generate a third plurality of encrypted signals encrypted based on the second encryption key for the one or more devices of the second region.

10. The one or more non-transitory computer-readable storage media of claim 9, wherein the operations further comprise:

receiving, from the one or more devices of a second region, a second plurality of encrypted signals accessed by the anonymized user nodes of the second region, wherein the second plurality of encrypted signals are encrypted based on the second encryption key for the one or more devices of the second region; and comparing the second plurality of encrypted signals and the third plurality of encrypted signals to identify the one or more intersecting signals accessed by the first plurality of anonymized user nodes of the first region and a second plurality of anonymized user nodes of the second region.

11. The one or more non-transitory computer-readable storage media of claim 7, wherein said calculating the weight of the particular intersecting signal is performed without revealing information of the anonymized user nodes inside the second region to the one or more computers of the first region.

12. The one or more non-transitory computer-readable storage media of claim 7, wherein the at least one edge is a cross-regional edge, and at least one anonymized user node of the first region is connected to an anonymized user node of the second region via the cross-regional edge.

13. A computer system comprising one or more hardware computer processors configured to perform operations comprising:

mapping a first plurality of user identifiers that are active in a first region to generate a first plurality of anonymized user nodes of the first region;

communicating with one or more devices of a second region, using a privacy set intersection (PSI) protocol, to identify one or more intersecting signals accessed by the first plurality of anonymized user nodes of the first region and a second plurality of anonymized user nodes of the second region;

constructing a user-signal-user graph based on, at least in part, the one or more intersecting signals and the first plurality of anonymized user nodes of the first region;

communicating with the one or more devices of the second region, using a secret sharing protocol, to calculate a weight of each intersecting signal, wherein said communicating comprises:

using the secret sharing protocol to determine a count of anonymized user nodes connected to a particular intersecting signal from the first region and the second region;

using the secret sharing protocol to determine a count of anonymized user nodes connected to each signal of a different type that neighbors the particular intersecting signal from the first region and the second region; and calculating the weight of the particular intersecting signal based on the count of anonymized user nodes connected to the particular intersecting signal and the count of anonymized user nodes connected to each signal of a different type that neighbors the particular intersecting signal; and constructing a user-user graph with at least one edge determined by, at least in part, the weight of each intersecting signal from the user-signal-user graph.

14. The computer system of claim 13, wherein communicating with one or more devices of a second region using a PSI protocol comprises:

encrypting, using a first encryption key for the one or more hardware computer processors, a list of signals accessed by the anonymized user nodes of the first region to generate a first plurality of encrypted signals.

15. The computer system of claim 14, wherein the operations further comprise:

receiving, from the one or more devices of a second region, a first plurality of doubly encrypted signals accessed by the anonymized user nodes of the first region, wherein the first plurality of doubly encrypted signals are further encrypted based on a second encryption key for the one or more devices of the second region; and decrypting, using the first encryption key for the one or more hardware computer processors, the first plurality of doubly encrypted signals accessed by the anonymized user nodes of the first region to generate a third plurality of encrypted signals encrypted based on the second encryption key for the one or more devices of the second region.

16. The computer system of claim 15, wherein the operations further comprise:

receiving, from the one or more devices of a second region, a second plurality of encrypted signals accessed by the anonymized user nodes of the second region, wherein the second plurality of encrypted signals are encrypted based on the second encryption key for the one or more devices of the second region; and comparing the second plurality of encrypted signals and the third plurality of encrypted signals to identify the one or more intersecting signals accessed by the first plurality of anonymized user nodes of the first region and a second plurality of anonymized user nodes of the second region.

17. The computer system of claim 13, wherein said calculating the weight of the particular intersecting signal is performed without revealing information of the anonymized user nodes inside the second region to the one or more hardware computer processors of the first region.

* * * * *